June 14, 1960 K. M. POOLE 2,941,074

TIME DIVISION MULTIPLEX COMMUNICATION SYSTEMS

Filed Oct. 28, 1957 2 Sheets-Sheet 1

INVENTOR
K. M. POOLE
BY Jonas Stelk
ATTORNEY

TIME DIVISION MULTIPLEX COMMUNICATION SYSTEMS

Filed Oct. 28, 1957

INVENTOR
K. M. POOLE
BY
[signature]
ATTORNEY 2,941,074

TIME DIVISION MULTIPLEX COMMUNICATION SYSTEMS

Kenneth M. Poole, New Providence, N.J., assignor to Bell Telephone Laboratories, Incorporated, New York, N.Y., a corporation of New York Filed Oct. 28, 1957, Ser. No. 692,747
10 Claims. (Cl. 250—27)

This invention relates to time division multiplex communication systems and more particularly to specific arrangements directed at reducing noise and crosstalk in such systems.

A variety of multiplex communication systems are known in the prior art. The primary advantage of such systems lies in bandwidth economy. A particular application wherein this advantage may be realized is a time division multiplex system installed between neighboring telephone central offices. Either the multiplex operation of existing cables or the augmentation of such cables with multiplexed microwave radio facilities offers attractive opportunities for the maximum utilization of channel capacities. Among the specific methods by which the multiplexing of an existing communication channel may be achieved are included gate type circuit methods, electronic commutators, and light operated or optical commutators.

In an electronic system a conventional method of multiplexing involves the use of a cathode-ray commutating tube, scanned and synchronized much as in television practice. The commutating tube includes a plurality of target elements equal in number to the channels to be multiplexed. In such a system, or in similar systems, particularly in cases where the number of channels to be multiplexed is high, 1000 channels for example, space considerations demand that the individual target elements be arranged in a relatively closely packed array. In known systems the physical proximity of each target element to the other elements in the target array introduces noise and crosstalk to a degree that markedly limits the otherwise inherent advantage of bandwidth economy. Various arrangements directed at shielding individual elements in an effort to reduce crosstalk have thus far been unsuccessful. The dynamic range of such arrangements has been limited since the maximum signal capacity and the zero signal noise level are both proportional to the beam current. Arrangements for more exact focusing of the scanning electron beam have thus far also failed to bring about any significant reduction in levels of noise and crosstalk.

It is, therefore, one subject of this invention to provide improved time division multiplex systems.

It is another object of this invention to reduce noise and crosstalk in time division multiplex systems.

A further object of one embodiment of this invention is to provide a target array for an electronic commutator tube of a time division multiplex system specifically adapted for use with certain improved arrangements for reducing noise and crosstalk.

A still further object of another embodiment of this invention is to provide a time division multiplex system employing voice modulated light and adapted to operate with a minimum of system noise and crosstalk.

These and other objects of this invention are realized in one specific embodiment wherein a plurality of incoming voice channels are coupled to the target elements of a multitarget cathode-ray tube. The target elements are essentially grounded grid triodes having a common wire anode and secondary emissive cathodes. With the electron beam of the cathode-ray tube scanning the whole array of cathodes sequentially, each element in its turn gives a pulse to the common anode proportional to the instantaneous voice signal amplitude on the corresponding incoming line.

In accordance with one aspect of my invention, the target elements are arranged in pairs, each pair being connected in a push-pull stage. Two signal elements are thus used for each voice channel. The choice of the physical position of the elements of any given element pair is governed by the criterion that they shall be symmetrically disposed with respect to their near neighbors. Each voice signal is impressed on the two elements assigned to it but with opposing phases. If the contribution to the signal at any element location due to the elements of a neighboring channel is examined, it will be noted that the separate effects will be equal and opposite and the resultant zero. Moreover, any element crosstalking into an adjacent channel will excite signals in the elements of that channel which will be in phase and hence may be rejected by the use of a conventional difference circuit at the end of the system.

The pulses transmitted to the common anode or collector are used to modulate a carrier frequency provided by a suitable oscillator. At the receiving end the pulse amplitude modulated signal is separated and distributed to the lines by using it to modulate the current in an electron beam which is simultaneously being scanned over an array of collectors. The scan is, of course, synchronized with that of the transmitter, each collector being connected to the appropriate line. In the receiver, as well as in the transmitter, the total contribution of signals intended for a neighboring channel pair will be zero, as will the contribution of the signal on any given pair to the differential signal on an adjacent or neighboring pair.

Objects of this invention are also realized in a second illustrative embodiment wherein pulse amplitude modulation is employed in a system which is basically optical or light operated as opposed to electronic. Individual voice frequency signals are applied to associated light sources in order to modulate the intensity of the light output from these sources. The light sources form an array which is viewed by a modified television camera. The output of the camera tube, a series of equally spaced pulses, is then used to modulate a carrier wave as in the electronic commutator system. The receiving end of the optical system employs a kinescope which scans an array of light sensitive elements or photoreceptors, the physical arrangement of which corresponds to the array of light generating elements in the transmitting apparatus. Synchronizing signals ensure the distribution of the pulses to the appropriate photoreceptor pairs and their associated outgoing lines. Conventional filter arrangements may be employed to reproduce the complex voice signal waves from the demultiplexed pulses.

Crosstalk in the optical system presents an even more serious problem than in the electronic system. Additional sources of crosstalk include scattering in the optical elements and environment and scattering in the screen and face plate of the receiving kinescope. Here again, however, substantial reduction of crosstalk is achieved in accordance with the principles of this invention by the use of two light generating elements for each voice frequency channel and by arranging each of these light generating pairs in a push-pull stage. In this manner, low levels of crosstalk are maintained despite the high spacial density of the light generating elements.

In accordance with one aspect of my invention the element push-pull pairs, the target electrodes of the electronic system or the light generating elements of the optical system, are arranged in a particular pattern or array. The axis of any given pair is perpendicular to the axes of all immediately adjacent pairs. Elements arranged in this fashion define rows and columns. Each row includes only single elements or only element pairs and each column includes only single elements or only element pairs.

I have discovered and verified that placing the target elements of the electronic system or the light generating elements of the optical system in push-pull stages arranged in the spacial pattern described results in substantial cancellation of crosstalk to a degree not afforded by known systems.

Maximum reduction of crosstalk is achieved by applying oppositely phased input signals to two suitably disposed signal elements only when the elements themselves are operated substantially linearly. In a given system, however, the reduction of noise may be a particularly important consideration. In accordance with the principles of my invention, a nonlinear operating condition may be selected at which the beam current in the receiving and transmitting devices will be near zero in the absence of signals. The zero signal noise level is thereby substantially reduced. The application of push-pull signals to an ideal pair of such elements will result in an undistorted output, one element responding to the portion of the input signal of positive sign and the other element responding to the positive portions of the inverted signal. The resulting doubling of the maximum signal capacity of each channel and the substantial reduction in zero signal noise both contribute to an increase in the dynamic range of the system.

Accordingly, another aspect of my invention involves the application of a particular value of negative bias to each target element, in the electronic system to the secondary emissive cathode and, in the optical system, to a suitable grid in the light generating source. I have discovered that in either system the use of a bias substantially at the midpoint of linear operation will be most conducive to the reduction of crosstalk and the use of a bias substantially at or near the point of cutoff will be most conducive to the reduction of noise. I have also discovered that in systems of the type described simultaneous reduction of both noise and crosstalk is achieved by the use of an intermediate bias located between the point of cutoff and the center point of linear operation.

It is therefore a feature of this invention that a time division multiplex system comprise a plurality of signal elements connected to electrical lines or paths, each of the signal elements being scanned in a sequence, and pairs of the signal elements being connected in push-pull stages. In one specific embodiment in accordance with this feature of my invention the signal elements are target elements of an electron beam discharge device and are sequentially scanned by the electron beam. In another specific illustrative embodiment in accordance with this feature the signal elements are light generating or light responsive elements sequentially scanned optically.

It is a further feature of this invention that the signal elements define an array wherein the axis joining the elements of any given pair is perpendicular to the axes of all immediately adjacent pairs. In accordance with this feature of my invention the signal elements are connected in push-pull pairs so that the elements define a plurality of rows and columns with each row including only single elements or only element pairs and with each column including only single elements or only element pairs.

It is still another feature of my invention that the signal elements be biased at a point between the center point of linear operation and the point of cutoff.

A complete understanding of this invention, together with additional objects and features thereof, will be gained from consideration of the following detailed description and accompanying drawing, in which.

Figure 1:
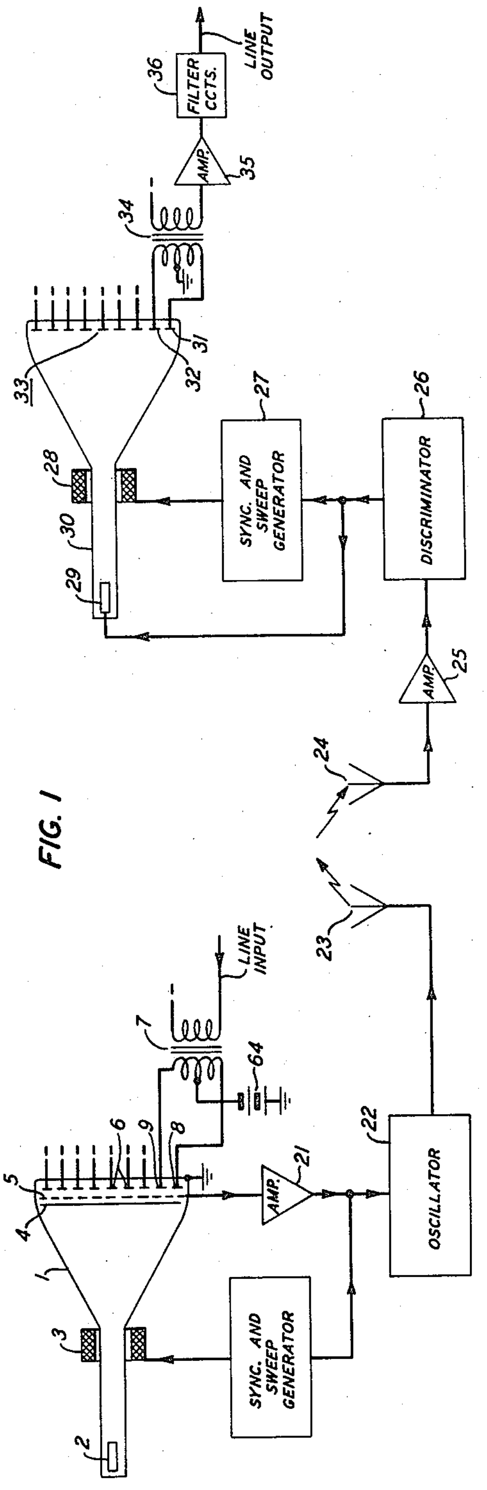
Fig. 1 shows one specific illustrative embodiment of the invention, a time division multiplex communication system of the electronic commutator type.

Referring to Fig. 1, the multiplexing function of the transmitting side of the time division multiplex communication system shown is performed by a cathode-ray tube device and its associated synchronizing and sweep generator, which includes envelope 1 and electron gun 2, a focusing and deflecting arrangement schematically represented by yoke 3, an apertured plate 4, a common collector 5 and an array of target elements 6. Each incoming voice signal is introduced into the system by an input transformer, one of which, 7, is shown. It will be noted that each incoming signal is fed to two target elements, for example, 8 and 9, connected as a push-pull stage. A single target element is shown in greater detail in Fig. 2. There the electron beam 10 is shown passing through aperture 11 in apertured plate 4. A second apertured plate 13 provides a shielding cavity 14 for each target element 6. Each target element 6 is connected to an individual line lead L through an insulating seal 16. The apertured plate 13, the housing 17, and the seal 16 form a part of the vacuum envelope of the tube. When the primary electron beam 10 passes through the apertured plate 4 and the grid 18 which covers each aperture of the apertured plate 13, it impinges on the secondary electron emissive surface of the target element 6. A secondary electron current 19 is thereby established between the surface of the target element 6 and the positive collector wires 5, the current being controlled by the instantaneous potential between the target element 6 and the grid 18. Thus, as the elements are scanned successively, current reaches the common collector 5 in a series of signal controlled pulses. The collector 5 may advantageously be a single wire sinuously wound so as to be positioned behind the apertured plate 4 midway between adjacent rows of target elements 6, the collector wire 5, however, not being between each pair of rows of target elements but positioned so that a given target element 6 is adjacent only one turn of the collector wire 5. However, it is to be understood that other collector arrangements may be employed for collecting the secondary electrons while being shielded from the primary electron beam.

A number of possible arrangements for the generation of line and frame synchronization signals may be employed. For example, slots, not shown, may be cut in the apertured plate 4 in lieu of the circular signal apertures 11. Behind each such slot a suitable secondary emitting layer may be used on the surface of the plate 13. As the primary electron beam scans the target array, large constant amplitude pulses will be generated by the impingment of the beam on the secondary emissive areas exposed by the slots. These pulses, being transmitted to the common collector 5, will form a part of the multiplexed pulse train. By conventional circuitry on the receiving side, the control pulses may be separated to perform the functions of line and frame synchronization.

In one illustrative system designed to multiplex 1,000 incoming voice signals, an advantageous current range for the primary electron beam was found to be of the order of one-half to one milliampere at 5,000 to 10,000 volts. Proper control over the secondary electron current was established with an input signal amplitude of several volts. The duration of each signal pulse was approximately $3\times10^{-8}$ second with a repetition rate of $10^7$ pulses per second. Scanning speed was set to return the primary beam to any specified target at approximately $10^{-4}$ second intervals. All of these values are, of course, illustrative and will depend on the design parameters of a given system.

Returning to Fig. 1, the pulse train with the addition of the synchronizing signals is amplified by amplifier 21. The amplified pulse train may then be transmitted by any one of a number of possible conventional arrangements. If microwave transmission is desirable, the amplifier 21 may advantageously be a distributed or chain amplifier of sufficient level to boost the pulse train to the point at which it may be used to produce frequency modulation of a suitable high frequency oscillator 22, for example, a backward wave oscillator. Phase modulation of a traveling wave tube is one of many alternative transmission arrangements which might in a given system prove more suitable.

Assuming that frequency modulation of a microwave carrier is used, the signal is transmitted from antenna 23 to receiving antenna 24, is amplified by amplifier 25, and is thence fed to discriminator 26. Synchronization pulses are separated and are led through conventional synchronizing circuits 27 to control the sweep signals applied to the yoke deflecting arrangement 28. The signal pulses are applied to the modulating grid of the electron gun 29 and are thereby impressed on its electron beam. The cathode-ray tube 30 on the receiving side of the system does not employ the apertured plate 4 or the collector 5 of the transmitting multiplexer, although these structures may be present without disadvantage. Instead, each individual target, for example, 31 and 32 of the receiving target array 33, is operated as a simple collector.

With the two commutator tubes being in synchronism, the sample pulses derived from a given voice frequency channel will be directed to the properly related target and will form a sufficient representation of the original signal. As in the transmitting multiplexer, each pair of target elements in the receiving demultiplexer cathode-ray tube, for example, 31 and 32, is connected in a push-pull stage. The output of transformer 34 is fed to amplifier 35. Averaging the pulse signals over a period comparable with the pulse interval by conventional filter circuits 36 will result in an output essentially identical to the original input signal. In its basic elements, the system represents a concentration of the whole multiplexing and demultiplexing functions into a pair of similar devices and their control circuits.

Figure 3:
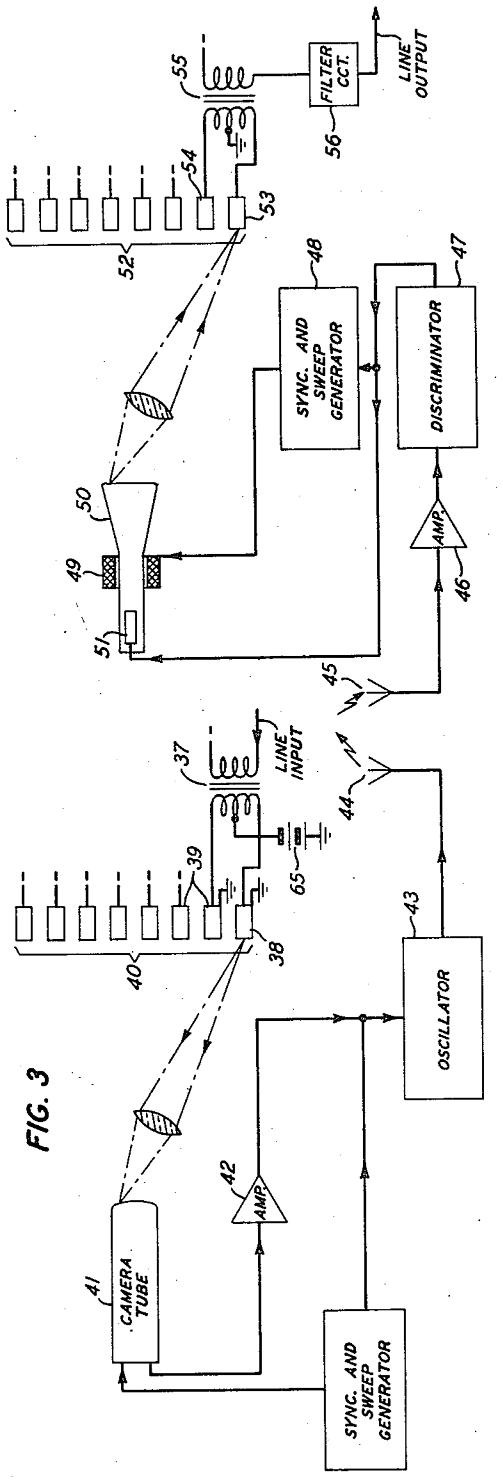
Fig. 3 shows a second specific illustrative embodiment of the invention, a time division multiplex system of the optical type employing modulated light.

Referring to Fig. 3, a second illustrative embodiment of the invention is shown comprising the transmitting and receiving sections of a time division multiplex system employing modulated light. As in the electronic system, individual incoming voice signals are introduced by an input transformer 37. Each signal is in turn fed to a pair of target elements, for example, 38 and 39, connected in a push-pull stage. Instead of the secondary emissive target elements of the electronic system, however, the optical system employs an array of light sources 40, the intensity of each of which is modulated by the incoming voice signals. In a relatively large system, for example, 1,000 incoming voice signals, the light sources 40 are required to have a response time to modulating signals of the order of $10^{-4}$ seconds and should be reasonably well matched in spectral characteristics to the camera tube 41. A variety of devices may be employed satisfactorily to meet these requirements. For example, certain types of gas filled glow lamps have proved suitable. In another specific arrangement, the requirements of the system were best met by a specially constructed planar tetrode with a fluorescent anode. Still other types of light generators capable of having their intensity modulated by incoming signals and geared to meet the specific design requirements of a given system may be readily designed by those skilled in the art.

The array of modulated light sources 40 is scanned by a television type camera tube 41 with the resultant pulse train output being amplified by amplifier 42. The amplified pulses are applied to modulate oscillator 43 and are shown being transmitted from transmitting antenna 44. As in the electronic system of Fig. 1, the pulse train output may, of course, be transmitted by a variety of methods. Assuming frequency modulation and microwave transmission is employed, the signal received at receiving antenna 45 is amplified by amplifier 46 and fed to discriminator 47. Synchronizing pulses are fed to conventional synchronizing circuits 48 and control the sweep signals applied to deflecting yoke 49 of the kinescope 50. The signal pulses of the pulse train are fed to the electron gun 51 of the kinescope 50. In this manner a visual replica of the bank of light sources 40 is established on the screen of the kinescope tube 50. An image of the tube face is thence formed on an array of light sensitive devices 52 each of which is positioned to receive from the kinescope screen the signal originated in a particular light source at the transmitter and each of which is connected to the corresponding voice frequency output line. For example, light sensitive devices 53 and 54 form a push-pull stage for the collection of a single signal which is thence fed to the output line by output transformer 55. As in the electronic system, averaging the pulse signals over a period comparable with the pulse interval by conventional filter circuits 56 will result in an output essentially identical to the original input signal. The light sensitive devices of the array 52 may be photomultipliers of conventional commercial design selected to meet the requirements of the given system but should be reasonably well matched in spectral characteristics to the kinescope 50.

Figure 2:
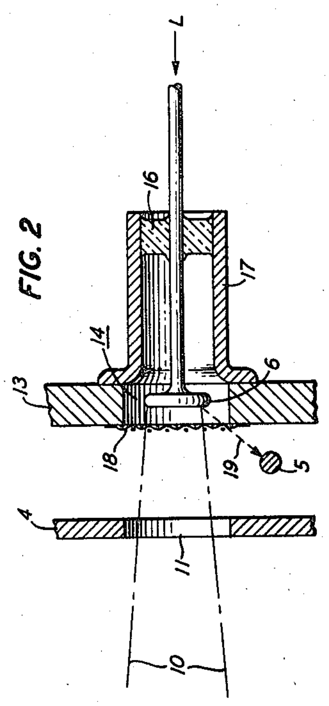
Fig. 2 shows an enlarged view of a single target element of the type employed in the target array of Fig. 1.

In the electronic time division multiplex system shown by Fig. 1 and Fig. 2 and in the optical system shown by Fig. 3, crosstalk, the appearance in one channel of signals purportedly confined to one or more of the remaining channels, is a limiting factor on the effectiveness of the systems. Such crosstalk can arise from several sources which include the existence of finite currents outside the desired limits of the focused beam, deficiencies of the transmission system, charge redistribution in the camera, scattering in the optical elements, and scattering in the screen and face plate of the receiving kinescope. Some of these sources of crosstalk are common to both systems and others are restricted to the optical system. In either case, however, the degree of crosstalk bears a substantial relationship to the spacial arrangement of channel locations. Both in principle and in practice a particular choice of array pattern may be used to reduce crosstalk.

Figure 5:
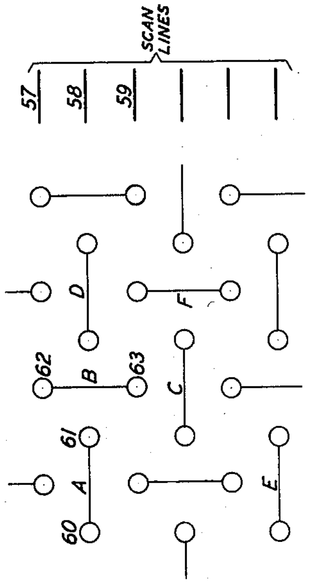
Fig. 5 shows a target arrangement in accordance with the principles of the invention wherein the target elements are connected in push-pull pairs in a staggered type of array.
Figure 4:
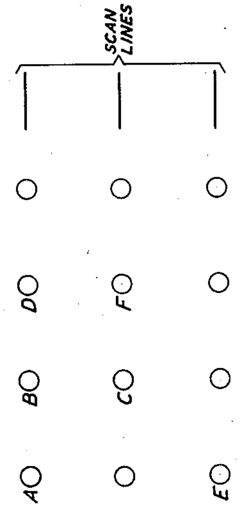
Fig. 4 shows a conventional multitarget array.

Specifically, I have found that a substantial reduction of crosstalk may be achieved by using two signal elements for each voice channel when these elements are arranged in an array in accordance with the features of the invention. Fig. 5 shows such an array of elements which is applicable either to the electronic system of Fig. 1 and Fig. 2 or to the optical system of Fig. 3. Fig. 4, for the purpose of comparison, shows a simple conventional array of elements with a single element serving each communication channel. In Fig. 4 and Fig. 5 each element or location is represented by a circle and in Fig. 5 the pair of elements associated in a push-pull stage to provide a single channel is joined by a line. For convenience certain elements, each representing a channel in Fig. 4, have been identified with the same letter designator as the element pair serving a corresponding channel in Fig. 5. It can be seen from Fig. 5, as in Fig. 4, that the pattern can be scanned completely by a series of uniformly spaced scanned lines, for example, 57, 58 and 59, that individual elements are sensed at uniform intervals along the scans and hence that the corresponding modulated pulses will be equally spaced in time as required for optimum bandwidth usage. It will also be noted that the spacial density of voice channels is the same in Fig. 5 as in Fig. 4. The density of elements in Fig. 5, however, is, of course, double that of Fig. 4. The particular distribution and spacing of the element pairs in Fig. 5 is such that the axis joining the elements of any given pair, for example, element pair B comprising elements 62 and 63, is perpendicular to the axes of all immediately adjacent pairs. The pairs immediately adjacent to pair B are identified A, C and D. An additional identifying feature of the array illustrated by Fig. 5 is the fact that the elements form rows and columns. Each row contains only element pairs or only single elements and each column contains only element pairs or only single elements.

The cancellation of crosstalk by the array of Fig. 5 may be understood by assuming a voice signal to be impressed on the two elements 60 and 61 serving channel A, remembering that the elements are connected in a push-pull stage and that phases will therefore be opposing. If the crosstalk contribution of a signal on channel B is examined at the location of element 61, it will be noted that the separate effects of the signal of element 62 and of element 63 on element 61 will be equal and opposite and their resultant zero. Furthermore, any element crosstalking into an adjacent channel will excite signals in the elements of that channel which will be in phase and hence may be rejected by the use of a conventional difference circuit at the end of the system.

Defining crosstalk as $$20 \log_{10} \frac{\text{A.C. current due to wanted channel}}{\text{A.C. current due to unwanted channel}}$$

when both channels are identically driven, crosstalk factors in a given system arranged in accordance with the features of the invention may be easily calculated as a function of distance from the position of maximum response, given the excitation of a receptor. For example, with a basic spacing of one-eighth inch in a specific optical system, that is, spacing between single elements in Fig. 4, or between centers of pairs of elements in Fig. 5, the crosstalk factors for the pairs of channels indicated, compared to crosstalk factors of the single element system, is as follows, taking channel A as the "wanted" channel:

| Unwanted Channel Number | Crosstalk Factors | |
|---|---|---|
| | Simple System, db | 2 Element System, db |
| B | 38.2 | ∞ |
| C | 41.4 | 66.4 |
| D | 43.2 | 58 |
| E | 43.2 | 59 |
| F | 44.8 | 75.6 |

In the illustrative case noted the improvement is substantial, amounting to approximately 20 db.

Figure 6:
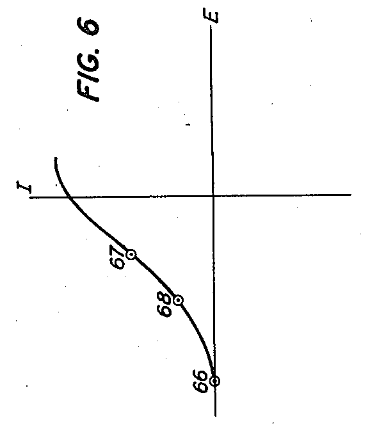
Fig. 6 shows a characteristic operating curve for a multiplexing target element with particular points of bias indicated.

The connection of signal elements, either optical or electronic, in push-pull pairs so as to form an array as shown in Fig. 5, contributes to the reduction of noise as well as to the reduction of crosstalk. I have found that whether the features of the invention, when embodied in a given system, contribute primarily to the reduction of noise or to the reduction of crosstalk depends primarily upon the degree of negative bias applied to the light source of the optical system or to the secondary emissive target of the electronic system. It will be noted that a source of bias 64 and 65 is provided in Fig. 1 and Fig. 3, respectively. Noise in the absence of a signal may be reduced to the same degree as it is possible to reduce the zero signal currents in the various components. It is apparent then that for maximum noise reduction the point of bias should be near the point of cutoff as shown by point 66 on the operating characteristic curve of Fig. 6. Maximum cancellation of crosstalk is attained by operating the two elements at such a bias that their response is linear, the bias point being represented by point 67 on the operating characteristic curve of Fig. 6. Some reduction in crosstalk should be expected, however, with the components biased for noise reduction, since there is some degree of similarity between the waveforms in the two cases. This similarity will be enhanced in practice, at the expense of noise reduction, by the incomplete sharpness of the cutoff in the components of the system. It is possible then to take advantage of the curvature of the component characteristics to reduce noise and crosstalk simultaneously. The increase of crosstalk as the operating point is moved away from point 67 and the increase of noise as the point is moved away from point 66 will be specific to a given set of components. The optimum selection of an operating point will then depend on the signal element characteristics and on the relative importance of noise and crosstalk in the system.

It is to be understood that the above-described embodiments of the invention are only illustrative of the principles of the invention. Numerous other arrangements may be devised by those skilled in the art without departing from the spirit, scope and teaching of the invention.

What is claimed is:

1. An electron beam tube including means for generating an electron beam, electron beam target means, and means including said generating means for scanning said target means in a preassigned scanning pattern, said target means comprising a plurality of target elements arranged in a two-dimensional array of staggered rows and columns, each alternate row and each alternate column consisting, respectively, of a single element from each alternate column and each alternate row, each intervening row and each intervening column consisting, respectively, of a single element from each intervening column and each intervening row, and means immune to the orientation of said scanning pattern in relation to said array for cancelling out the instantaneous electrical influence of any particular element on any element immediately adjacent thereto created by the impingement of said beam on said particular element, said cancelling means comprising means connecting each element in each alternate row in push-pull with only a single respective adjacent element lying in the same row, and means connecting each element in each intervening row in push-pull with only a single respective adjacent element lying in the same column.

2. Apparatus in accordance with claim 1 wherein each of said connecting means includes the secondary winding of a transformer.

3. Apparatus in accordance with claim 1 wherein each of said connecting means includes the primary winding of a transformer.

4. An electron beam tube including means for generating an electron beam, electron beam target means, and means including said generating means for scanning said target means in a preassigned scanning pattern, said target means comprising a plurality of target elements arranged in a two-dimensional array of mutually perpendicular staggered rows and columns, each alternate row and each alternate column consisting, respectively, of a single element from each alternate column and each alternate row, each intervening row and each intervening column consisting, respectively, of a single element from each intervening column and each intervening row, and means immune to the orientation of said scanning pattern in relation to said array for cancelling out the instantaneous electrical influence of any particular element on any element immediately adjacent thereto created by the impingement of said beam on said particular element, said cancelling means comprising means connecting, respectively, each odd numbered element of each alternate odd numbered row in push-pull with the succeeding even numbered element of the same row, means connecting, respectively, each odd numbered element of each intervening odd numbered row in push-pull with the preceding even numbered element of the same row, means connecting, respectively, each odd numbered element of each alternate even numbered row in push-pull with the element of the following even numbered row lying in the same column, and means connecting, respectively, each even numbered element of each intervening even numbered row in push-pull with the element of the following even numbered row lying in the same column.

5. Apparatus as defined in claim 4 wherein said target elements are secondary-electron emissive and including a collector element adjacent said target elements.

6. Apparatus as defined in claim 4 including means biasing said target elements at a point midway between the point of cutoff and the mid-point of linear operation of said elements.

7. In a communication system, a time division distributor comprising, in combination, a two-dimensional array of secondary-electron emissive target elements, and electron gun means for projecting an electron beam against said elements in a preassigned scanning pattern, said array comprising mutually perpendicular rows and columns of said elements, each alternate one of said rows and each alternate one of said columns consisting, respectively, of a single element from each alternate row and each alternate column, each intervening one of said rows and each intervening one of said columns consisting, respectively, of a single element from each intervening column and each intervening row, whereby the positions occupied by said elements in each of said rows and in each of said columns are in staggered relation to the positions of said elements in adjacent rows and in adjacent columns, respectively, and means immune to the orientation of said scanning pattern in relation to said array for cancelling out the instantaneous electrical influence of any particular element on any element immediately adjacent thereto created by the impingement of said beam on said particular element, said cancelling means comprising means connecting each element in each alternate row in push-pull with only a single respective adjacent element lying in the same row, and means connecting each element in each intervening row in push-pull with only a single respective adjacent element lying in the same column.

8. A beam electron discharge device including, in combination, a two-dimensional array of target elements, and means including an electron beam for successively applying electrical signals to said elements, said array comprising staggered, mutually perpendicular rows and columns of said elements, each alternate row and each alternate column consisting, respectively, of a single element from each alternate column and each alternate row, each intervening row and each intervening column consisting, respectively, of a single element from each intervening column and each intervening row, and means immune to the order in which said electron beam applies said electrical signals to said elements for cancelling out the instantaneous electrical influence of any particular element on any element immediately adjacent thereto created by the impingement of said beam on said particular element, said cancelling means comprising, means connecting, respectively, each odd numbered element of each alternate odd numbered row in push-pull with the succeeding even numbered element of the same row, means connecting, respectively, each odd numbered element of each intervening odd numbered row in push-pull with the preceding even numbered element of the same row, means connecting, respectively, each odd numbered element of each alternate even numbered row in push-pull with the element of the following even numbered row lying in the same column, and means connecting, respectively, each even numbered element of each intervening even numbered row in push-pull with the element of the following even numbered row lying in the same column.

9. An electron beam tube including means for generating an electron beam, electron beam target means, and means including said generating means for scanning said target means in a preassigned scanning pattern, said target means comprising a plurality of target elements arranged in a two-dimensional array of mutually perpendicular rows and columns, each of said elements lying in a respective one of said rows and in a respective one of said columns, and means immune to the orientation of said scanning pattern in relation to said array for cancelling out the instantaneous electrical influence of any particular element on any element immediately adjacent thereto created by the impingement of said beam on said particular element, said cancelling means comprising means connecting each alternate one of said elements in each alternate one of said columns, respectively, in push-pull with the diagonally adjacent element lying in the preceding adjacent column and in the preceding adjacent row, and means connecting each intervening one of said elements in each alternate one of said columns, respectively, in push-pull with the diagonally adjacent element lying in the following adjacent column and in the preceding adjacent row.

10. An electron beam tube including means for generating an electron beam, electron beam target means, and means including said generating means for scanning said target means in a preassigned scanning pattern, said target means comprising a plurality of target elements arranged in a two-dimensional array of rows and columns, each of said elements lying in a respective one of said rows and in a respective one of said columns, and means immune to the orientation of said scanning pattern in relation to said array for cancelling out the instantaneous electrical influence of any particular element on any element immediately adjacent thereto created by the impingement of said beam on said particular element, said cancelling means comprising means connecting each alternate one of said elements in each alternate one of said columns, respectively, in push-pull with the diagonally adjacent element lying in the preceding adjacent column and in the following adjacent row, and means connecting each intervening one of said elements in each alternate one of said columns in push-pull with the diagonally adjacent element lying in the following adjacent column and in the following adjacent row.

References Cited in the file of this patent

UNITED STATES PATENTS 2,498,688 Lesti ---------------- Feb. 28, 1950